(12) United States Patent
McCoy

(10) Patent No.: US 6,576,883 B1
(45) Date of Patent: Jun. 10, 2003

(54) NON-LINEAR GAIN COMPENSATION FOR OPTICAL SCANNERS

(75) Inventor: Joseph Scott McCoy, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 09/668,979

(22) Filed: Sep. 25, 2000

(51) Int. Cl.[7] .............................................. H01L 31/00
(52) U.S. Cl. ............................. 250/214 AG; 250/235; 250/214 A; 358/446; 348/229
(58) Field of Search ................................. 250/235, 234, 250/214 A, 214 AG, 214 R, 214 C, 214 L; 358/412, 446, 514, 483; 348/229; 327/513, 514, 515, 560, 362; 330/308, 110

(56) References Cited

U.S. PATENT DOCUMENTS

| | | | | |
|---|---|---|---|---|
| 5,117,119 A | * | 5/1992 | Schubert et al. ...... 250/214 AG |
| 5,377,020 A | * | 12/1994 | Smitt ........................ 358/3.14 |
| 5,502,578 A | * | 3/1996 | Smitt .......................... 358/474 |
| 5,621,205 A | * | 4/1997 | Warner et al. .............. 250/205 |
| 5,986,705 A | * | 11/1999 | Shibuya et al. ............ 348/362 |
| 6,037,584 A | | 3/2000 | Johnson et al. ............. 250/235 |
| 6,038,038 A | * | 3/2000 | Selby et al. ................ 358/446 |
| 6,204,881 B1 | * | 3/2001 | Ikeda et al. ................. 348/362 |
| 6,262,816 B1 | * | 7/2001 | Rindsig et al. ............. 358/498 |
| 6,331,832 B1 | * | 12/2001 | Rushing ..................... 341/139 |

* cited by examiner

Primary Examiner—Kevin Pyo
Assistant Examiner—Seung C. Sohn

(57) ABSTRACT

A scanner includes a photodetector, a dc motor drive and a gain compensation control for non-linearly adjusting the gain of at least one channel of the photodetector. The gain compensation control may adjust the gain by selecting different gain rates according to variations from a nominal exposure time.

20 Claims, 2 Drawing Sheets

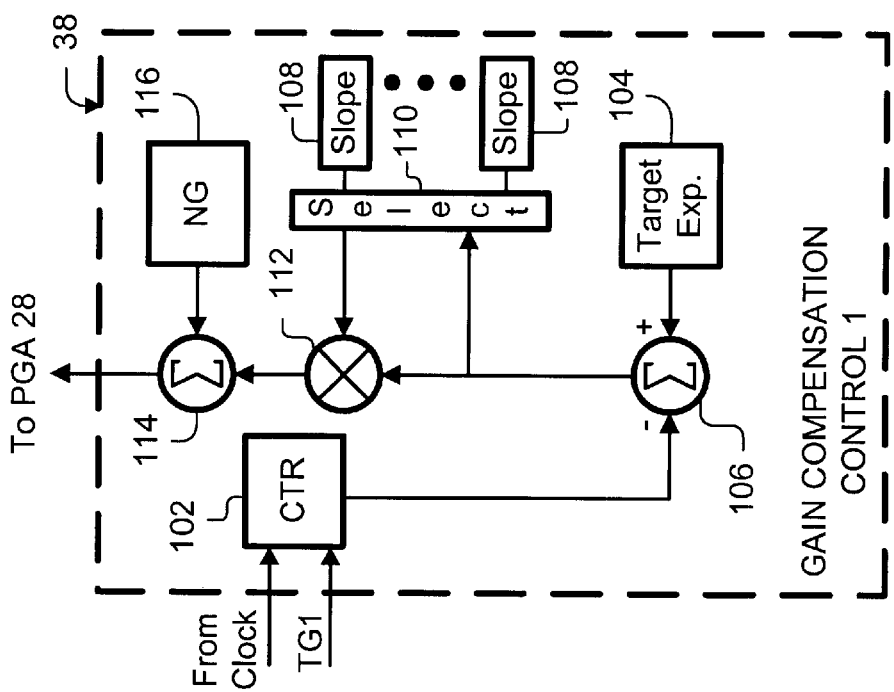
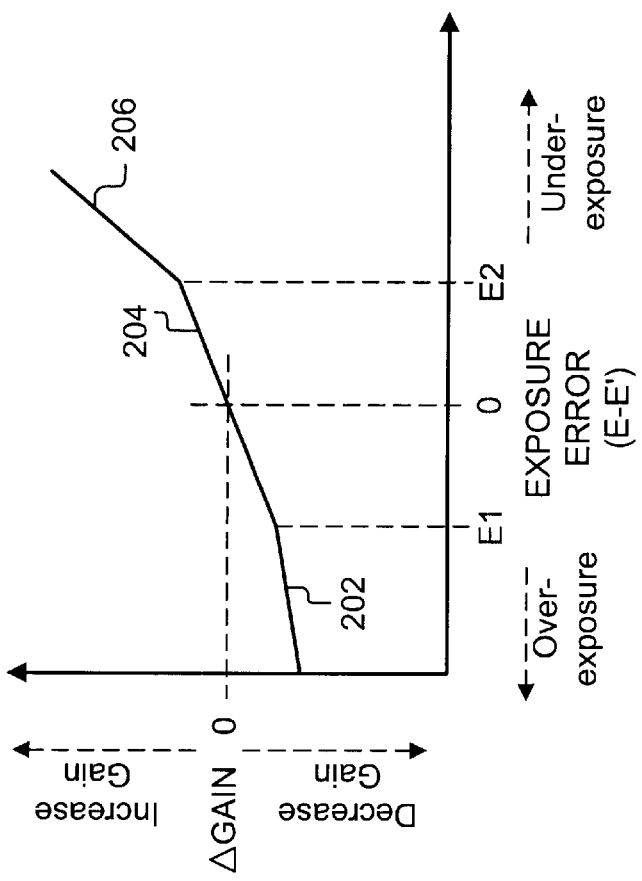
FIG. 2
FIG. 3

NON-LINEAR GAIN COMPENSATION FOR OPTICAL SCANNERS

BACKGROUND OF THE INVENTION

The present invention relates to imaging devices. More specifically, the present invention relates to an exposure control for an optical scanner.

A typical optical scanner uses a motor drive to move a charge coupled device ("CCD") across a sheet of paper. In a color copier or flatbed scanner, for instance, the CCD is moved along the sheet of paper at a constant velocity. As the CCD is being moved, lines of pixels are generated. Each line of pixels is given a constant exposure time; therefore, the exact size of the pixels that make up a scanned image is a direct function of the motion accuracy of the drive system.

The motor drive may include a step motor, which can be controlled to a high positional accuracy. However, an inexpensive step motor can cause residual position errors to appear in scanned images as "color fringes" around black-to-white edges. Color fringes and "jaggies" can degrade image quality and they can severely reduce the accuracy of text recognition software, such as optical character recognition ("OCR") programs.

There are other limitations associated with step motors. A step motor can be noisy, it has a limited range of speeds over which it can perform acceptably, and its power consumption is relatively high. Additionally, motion of the step motor is inherently oscillatory because it is driven by discrete step inputs. The oscillatory motion can cause color fringes in a scanner using a three-channel RGB CCD.

Scan motion accuracy is often limited by the finite step size. Even if the step motor is microstepped to improve resolution and reduce torque ripple, some motion errors are still inevitable.

An inexpensive step motor drive system does not have position or velocity feedback, so there is no way of knowing the true position of the CCD or whether the step motor has stalled. Therefore, the step motor is typically overdriven with a considerable amount of extra torque to satisfy the worst case load. Overdriving increases the size, cost and heat dissipation of the motor driver.

Assignee's U.S. Pat. No. 6,037,584 discloses scanners that include dc motor drives instead of step motor drives. These scanners are accurate enough to produce quality images and meet the cost, size, weight, and power requirements of low cost commercial scanning products such as flatbed scanners, scrollfed scanners, color copiers, fax machines and all-in-one multi-function products. The dc motors have a smaller size, quieter operation and smoother motion than step motors used in similar products. The dc motors also have a broader speed range (including higher speeds), lower power consumption, and simpler drive electronics. Additionally, the dc motors are lower in cost at an equivalent level of performance.

SUMMARY OF THE INVENTION

According to one aspect of the present invention, an optical scanning system includes a photodetector including at least one channel; and a non-linear gain compensation control for at least one channel of the photodetector. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is an illustration of a non-linear gain compensation control, which forms a part of the scanner shown in FIG. 1; and FIG. 3 is an illustration of an exemplary profile of gain rates for the control shown in FIG. 2.

DETAILED DESCRIPTION OF THE INVENTION

Figure 1:
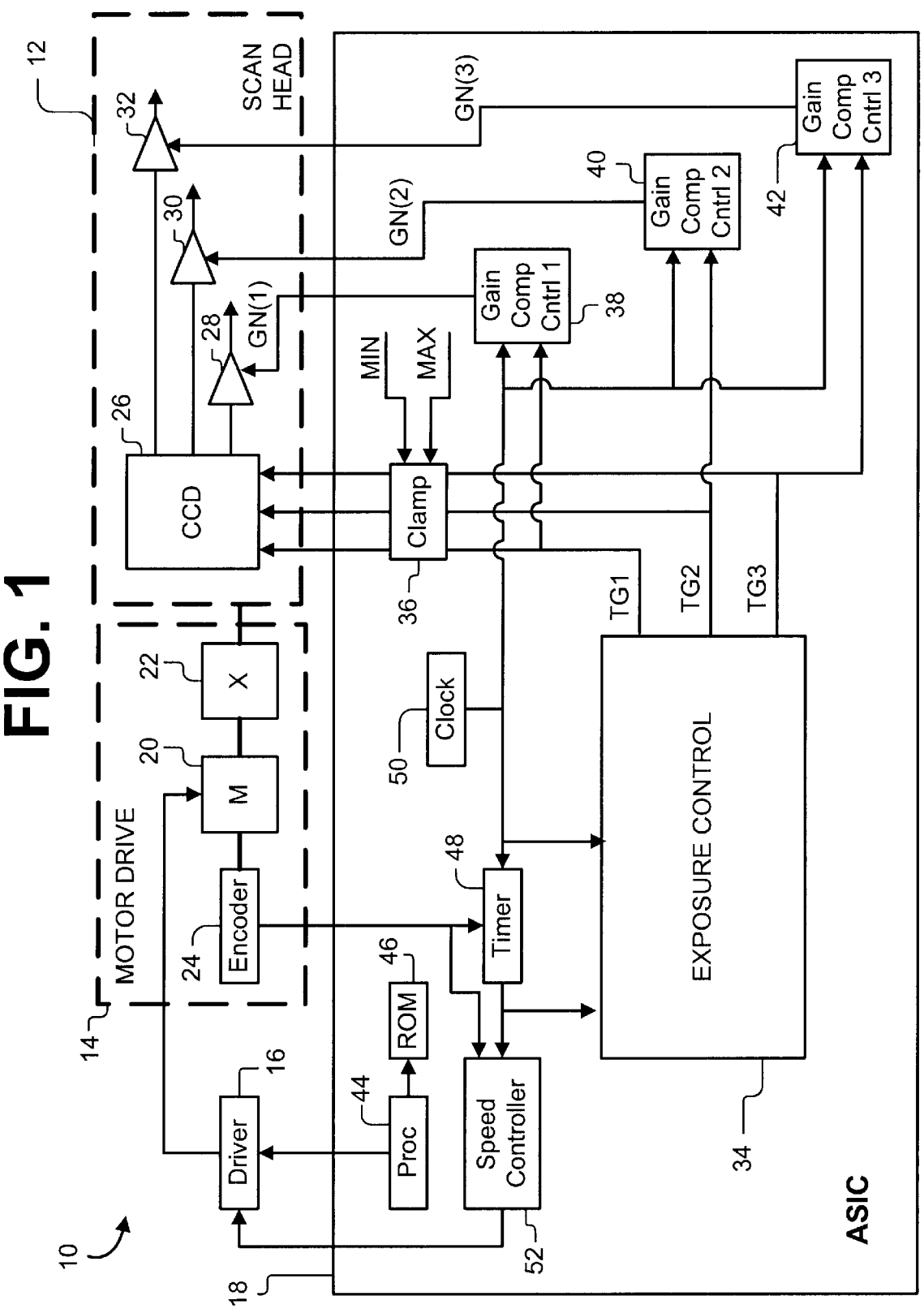
FIG. 1 is an illustration of a scanner according to the present invention.

As shown in the drawings for purposes of illustration, the present invention is embodied in a scanner. The scanner includes a detector, a dc motor drive, and non-linear gain compensation controls. The dc motor drive is prone to high servo errors, especially at slow speeds. However, the gain compensation controls can select different gain rates to compensate for the high servo errors. Thus, the gain compensation controls allow the use of slower servo speeds to obtain higher-quality, higher-resolution images. Moreover, the gain compensation controls avoid the use of dividers, which are costly for a hardware implementation.

Reference is now made to FIG. 1. A flatbed scanner 10 includes a scan head 12, a dc motor drive 14, and an electronics assembly including a motor driver 16 and an application specific integrated circuit ("ASIC") 18. A glass pane and a housing (not shown) form an enclosure inside which the scan head 12, the dc motor drive 14 and the electronics assembly are mounted. The glass pane provides a scan plane.

The dc motor drive 14 includes a dc motor 20 and transmission 22 for moving the scan head 12 along the scan plane. The dc motor driver 16 may be an H-bridge motor driver. The driver 16 has an input that is adapted to receive pulse width modulated ("PWM") signals from a motion controller/speed controller on the ASIC 18. The PWM signals cause the dc motor driver 16 to selectively energize field windings of the dc motor 20 to create a motor torque that rotates a shaft of the dc motor 20.

A typical transmission 22 includes a gear train and timing belt. The motor shaft drives the gear train, which turns the timing belt. The timing belt, in turn, moves the scan head 12 along the scan plane. Speed of the scan head 12 along the scan plane is varied by varying the speed of the dc motor 20. The scan head 12 is moved at slower speeds for higher resolution scans.

The dc motor drive 14 further includes an encoder assembly 24 coupled to the shaft of the dc motor 20. The encoder assembly 24 generates pulses or some other kind of marks that represent relative incremental rotation of the motor shaft and therefore, incremental motion of the scan head 12.

To scan a sheet of paper, the sheet is positioned atop the glass pane, and a host (e.g., a personal computer) commands the ASIC 18 to begin a scanning operation. The host might also supply a scan resolution such as 1200 dots per inch ("dpi") to the electronics assembly. Under control of the ASIC 18, the dc motor drive 14 moves the scan head 12 to a known position (e.g., a wall) and then starts scanning the scan head 12 along the scan plane. A fluorescent bulb (not shown) of the scan head 12 is turned on to illuminate a portion of the sheet with white light, and an optics assembly (not shown) focuses an image of the illuminated portion onto a charge coupled device ("CCD") 26. The CCD 26 is exposed to, and integrates, a line of pixels at a time, and the ASIC 18 processes signals generated by the CCD 26 and sends the processed signals to the host. The entire sheet is scanned, line-by-line as the scan head 12 is moved along the scan plane.

The CCD 26 typically has a Red channel including a first row of photodiodes sensitive to red light, a Green channel including a second row of photodiodes sensitive to green light, and a Blue channel including a third row of photodiodes sensitive to blue light. Transfer gate and CCD analog shift registers are provided for each channel. Each channel is adapted to receive a transfer gate signal TG1, TG2, TG3. When a transfer gate signal is de-asserted, the photodiodes accumulate charge. When a transfer gate signal is asserted, the charge accumulated by the photodiodes is transferred to the analog shift register. The analog shift registers then serially read out the charges to an amplifier chip including programmable gain amplifiers 28, 30 and 32. There is a programmable gain amplifier 28, 30, 32 for each channel. Analog outputs of the programmable gain amplifiers 28, 30 and 32 are then A/D converted and sent to the host.

The dc motor drive 14 is prone to high servo errors, especially at slow speeds. However, gains are adjusted to correct the servo errors.

The ASIC 18 includes an exposure control 34, which receives speed or position information from the encoder assembly 24 and adjusts the exposure time of the CCD 26 such that exactly one pixel distance is traversed during each exposure time, regardless of any position or velocity errors in controlling the dc motor 20. The exposure control 34 generates the transfer gate signals TG1, TG2 and TG3 for the three channels of the CCD 26. To scan a line, the exposure control 34 de-asserts the transfer gate signal to begin an exposure time, processes the encoder pulses and then asserts the transfer gate signals to stop the exposure time after a specified amount of relative motion has occurred. Thus, the exposure control 34 varies the exposure time to ensure that each exposure time corresponds to the same displacement and that the lines of pixels in a scanned image are all of uniform size. An exemplary exposure control 34 is described in greater detail in assignee's U.S. Pat. No. 6,037,584, which is incorporated herein by reference. Such an exposure control 34 allows the dc motor 20 to be used in low cost commercial scanning products.

The ASIC 18 further includes a clamp 36 for ensuring that each exposure time is within minimum and maximum limits. Clamping to the minimum limit prevents corruption of a new scan line from a previous scan line. Clamping to the maximum limit prevents saturation of the CCD 26.

The ASIC 18 further includes first, second and third gain compensation controls 38, 40 and 42 for supplying the gains, represented by gain codes GN(1), GN(2) and GN(3), to the corresponding programmable gain amplifiers 28, 30 and 32. The gain compensation controls 38, 40 and 42 adjust gain to maintain a uniform exposure level. The exposure level is a product of reflected light intensity from the object being scanned, CCD sensor responsivity, exposure time, and gain. The reflected light intensity and the CCD sensor responsivity are relatively constant throughout a scan. Therefore, the exposure level is held at a relatively uniform level by decreasing the gain to offset an increase in the exposure time, and by increasing the gain to offset a decrease in exposure time.

Ideally, the gain G would be expressed as follows:

$$G=(E/E')NG$$

where E is ideal exposure time, E' is actual exposure time and NG is a nominal gain. However, determining the ideal gain would involve a divide operation, which would be costly to implement in hardware.

The divide operation can be avoided by expressing the gain G as follows.

$$G=NG+(E-E')F(E-E')$$

where (E-E') is exposure error or a difference between ideal exposure time and measured exposure time, and F(E-E') is a non-linear function that converts the exposure error (E-E') to a delta gain. Typically, the ideal gain will oscillate about the nominal gain. The delta gain adjusts the nominal gain for this oscillation that is, the delta gain provides an offset to the nominal gain.

The gain compensation controls 38, 40 and 42 are non-linear in that they use different gain rates to compensate for the exposure error and, therefore, compensate for servo errors in the dc motor drive 14. Thus, the gain compensation circuit allows a reduction in servo speed to obtain high-quality, high-resolution images. An exemplary gain compensation control will be described below in connection with FIG. 2.

The ASIC 18 further includes an embedded processor 44 that is programmed by a read-only memory 46 ("ROM"). The ROM 46 stores a real-time operating system for the embedded processor 44. The ROM 46 also stores instructions for instructing the embedded processor 44 to perform I/O functions and perform the general control of the scanner 10.

The embedded processor 44 may also be programmed to implement a bulb servo control for compensating the intensity and spectrum drift of the fluorescent bulb. The bulb servo control updates nominal gains in the gain compensation controls 38, 40 and 42 in response to changes in intensity and drifts in spectrum of the bulb. A bulb servo control is disclosed in assignee's U.S. Pat. No. 5,907,742, which is incorporated herein by reference.

The embedded processor 44 is also programmed to implement an open or closed loop motion controller that accelerates the scan head 12 to a scan speed and maintains the scan speed at a relatively constant speed during a scan operation. A closed loop motion controller could include a simple proportion-integral-derivative (PID) controller that receives position feedback from the encoder 24 and velocity feedback from an interval timer 48. The interval timer 48 measures time periods between encoder pulses. The time periods are measured by counting clock pulses supplied by a system clock 50.

The ASIC 18 also includes a speed controller 52 that controls slew rate of the dc motor 20. Performing the speed control using a dedicated controller instead of the embedded processor 44 reduces the processing burden on the embedded processor 44 and frees it up to perform other functions.

FIG. 2 shows an exemplary first gain compensation control 38 in greater detail. The first gain compensation control 38 includes a counter 102 that measures the time between assertions of the first transfer gate signal TG1. The counter 102 may be a synchronous state machine running off the system clock 50. The counter 102 may be incremented by pulses from the system clock 50 and reset after the first transfer gate signal TG1 is asserted. Thus, the actual exposure time (E') is measured as the time between assertions of the first transfer gate signal TG1 and is represented by a count of clock pulses.

The ideal exposure time (E) may be taken from a lookup table 104 of ideal exposure times. The lookup table 104 may be stored in ROM 46. An exposure error signal is determined by a first summing junction 106, which subtracts the actual exposure time (E') from the ideal exposure time (E).

The exposure error signal (E–E') is used to select a gain rate from a plurality of gain rates. The gain rates are stored in second registers 108. A selector 110 selects a gain rate in response to the error signal. For example, if two gain rates are available, the sign bit of the error signal may be used to make the selection: a first gain rate is selected if the sign is negative, and a second gain rate is selected if the sign is positive. If four gain rates are available, the two most significant bits of the error signal (E–E') may be used to select a gain rate.

The delta gain is provided by a multiplier 112, which multiplies the exposure error (E–E') by the selected gain rate. A second summing junction 114 adds the delta gain to the nominal gain (NG). The nominal gain (NG) is stored in a third register 116. A gain code GN(1) is provided by the second summing junction 114 to the first programmable gain amplifier 28 during assertion of the first transfer gate signal TG1.

The gain compensation control 38 determines a gain for each line of pixels. Thus, gain compensation is performed on a line-by-line basis.

It is understood that all three gain compensation controls 38, 40 and 42 may have the same construction.

FIG. 3 shows an exemplary profile for the gain rate. The profile includes three pieces 202, 204 and 206, with each piece representing a linear gain rate. The pieces 202, 204 and 206 are linked together in a piecewise manner. A piece 202, 204 or 206 is selected according to the exposure error signal. The first piece 202 is selected if the exposure error is less than E1, the second piece 204 is selected if the exposure error is between E1 and E2, and the third piece 206 is selected if the exposure error is greater than E2. The positive slope of each piece 202, 204 and 206 indicates that the gain is increased if underexposure occurs and that the gain is amount of reduced if overexposure occurs.

Although the profiles are not limited to linear pieces, linear pieces are easiest to implement. The actual number of pieces and the slopes of each piece are deterministic. If the pixel error tolerance is known, pieces may added and slopes may be changed until the pixel error comes within the tolerance.

Thus disclosed is a scanner including a dc motor, which has a smaller size, quieter operation and smoother motion than a step motor. The dc motor also has a broader speed range (including higher speeds), lower power consumption, and simpler drive electronics than a step motor in a similar product. Additionally, the dc motor is lower in cost at an equivalent level of performance.

The non-linear gain compensation controls allow slower servo speeds to obtain higher-quality, higher-resolution images. Moreover, the non-linear gain compensation controls avoid the use of dividers, which are costly to implement in hardware.

Although the present invention was described in connection with a flatbed scanner, it is not so limited. The present invention may be applied to a scrollfed scanner, in which case the dc motor and transmission would drive a sheet feeder instead of moving a scan head. Other applications of the present invention include, but are not limited to low cost commercial scanning products such as copiers, fax machines, and multi-function products.

A detector other than a CCD could be used. Other types of detectors that could be used include CMOS detectors and active pixel sensors. If the detector is an active pixel sensor, the exposure control system would not include a transfer gate generator. A transfer gate implies a serial shift register, which is specific to CCD-type detectors. Instead, the exposure control would include a different type of shutter control that starts and stops the exposure intervals. The shutter control for an active pixel sensor would be little more than a switch that turns the detectors or light sources on and off.

The exposure control, gain compensation control, speed controller and embedded processor could be fabricated on a single ASIC, they could be fabricated on multiple ASICs, or they could be fabricated on one or more field programmable gate arrays.

Design considerations depend upon factors such as the quality and cost of the scanner. Gains can be digital or analog and they can be applied in the scanner or a host.

The present invention is not limited to the specific embodiments described above. Instead, the invention is construed according to the claims that follow.

What is claimed is:

1. An optical scanning system comprising:
    a photodetector including at least one channel; and
    a non-linear gain compensation control for at least one channel of the photodetector, the non-linear control selecting a gain rate from a plurality of candidate gain rates as a function of exposure error of the photodetector.

2. The system of claim 1, wherein the gain compensation control adjusts gain by selecting different gain rates according to variations from a nominal exposure time.

3. The system of claim 1, wherein the control computes gain (G) as G=NG+(E–E')F(E–E'), where (E–E') is the exposure error as a difference between ideal exposure time (E') and measured exposure time (E), and F(E–E') is a non-linear function that converts the exposure error (E–E') to a delta gain.

4. The system of claim 1 wherein the gain rates are linear.

5. The system of claim 1, wherein the gain rates are piecewise.

6. The system of claim 1, further comprising a programmable gain amplifier for each channel, the gain compensation control reducing gain of the amplifier when exposure time is greater than a nominal gain and increasing the amplifier gain when measured exposure time is below a nominal gain.

7. The system of claim 1, wherein a gain is computed for each line of the photodetector, whereby gain compensation is performed on a line-by-line basis.

8. The scanning system of claim 1, wherein the photodetector includes at least one row of photodetector elements, exposure time of the photodetector elements being stopped and started in response to a first signal; and wherein the system further comprises:
    a motion detector for detecting relative motion with respect to the photodetector, an output of the motion detection means providing a second signal indicating a characteristic of the relative motion; and
    an exposure control, responsive to the second signal, for generating the first signal to control the starting and stopping of the exposure time, the exposure control starting the exposure time and then stopping the exposure time after a specified amount of relative motion has been detected;
    whereby variations in the amount of relative motion cause inversely proportional variations in the exposure time to ensure that lines of pixels of a scanned image are all of uniform size.

9. An optical scanning system comprising:
    a photodetector including at least one channel;
    a non-linear gain compensation control for at least one channel of the photodetector; and a servo including a dc motor;

the gain compensation control determining gain rates that compensate for servo error.

10. A method of determining a gain for a line of pixels of a photodetector in an optical scanning system, the system including a dc drive, the method comprising:

computing an error signal indicative of servo error of the dc drive;

selecting a linear gain rate from a plurality of candidates, the selection made according to the error signal, determining a gain offset from the selected linear gain rate; and adding the gain offset to a nominal gain.

11. The method of claim 10, wherein the error signal is computed as a difference between measured and nominal exposure times.

12. Apparatus comprising:

multiple rows of photodetector elements for detecting multiple color planes of an image;

a dc motor drive;

programmable gain amplifiers coupled to channel outputs of the photodetector; and at least one gain compensation control for providing a gain to an amplifier, each gain compensation control selecting a gain rate from at least two candidates, the gain rate selected in response to a signal indicating exposure error; multiplying the exposure error signal by the selected gain rate to obtain a delta gain, and summing the delta gain with a nominal gain to obtain the gain.

13. The apparatus of claim 12, wherein the at least one control computes the error signal as a difference between measured and nominal exposure times.

14. The apparatus of claim 12, wherein the candidates are linear gain rates.

15. The apparatus of claim 12, wherein the candidates are piecewise gain rates.

16. An optical scanning system comprising:

a photodetector including at least one channel; and means for non-linearly adjusting the gain of at least one channel of the photodetector, the adjusting means selecting different gain rates to adjust the gain, the gain rates being selected according to exposure error.

17. A circuit for controlling gain of a photodetector channel in an optical scanning system, the circuit comprising:

a programmable gain amplifier; and a control for providing a gain code to the amplifier, the control selecting a gain rate from at least two candidates in response to a signal indicating exposure error; multiplying the error signal by the selected gain rate to obtain a delta gain, and summing the delta gain with a nominal gain to obtain the gain code.

18. The circuit of claim 17, wherein the control computes the error signal as a difference between measured and nominal exposure times.

19. The circuit of claim 17, wherein the candidates are linear gain rates.

20. The circuit of claim 17, wherein the candidates are piecewise gain rates.

* * * * *